(12) United States Patent
McKinzie et al.

(10) Patent No.: US 8,896,167 B2
(45) Date of Patent: Nov. 25, 2014

(54) ELECTRIC MACHINE ROTOR COOLING METHOD

(75) Inventors: Kyle K. McKinzie, Altamont, KS (US); Daryl T. Brown, Alvin, TX (US); Gary Brown, legal representative, Alvin, TX (US)

(73) Assignee: Deere & Company, Moline, IL (US)

( * ) Notice: Subject to any disclaimer, the term of this patent is extended or adjusted under 35 U.S.C. 154(b) by 208 days.

(21) Appl. No.: 13/481,203

(22) Filed: May 25, 2012

(65) Prior Publication Data

US 2013/0313928 A1 Nov. 28, 2013

(51) Int. Cl.
*H02K 9/00* (2006.01)
*H02K 9/19* (2006.01)
*H02K 1/32* (2006.01)

(52) U.S. Cl.
CPC ............... *H02K 9/005* (2013.01); *H02K 9/19* (2013.01); *H02K 1/32* (2013.01)
USPC ............................................ 310/61; 310/60 A

(58) Field of Classification Search
None
See application file for complete search history.

(56) References Cited

U.S. PATENT DOCUMENTS

| | | | | |
|---|---|---|---|---|
| 3,558,943 A | * | 1/1971 | Nilsson | 310/58 |
| 4,101,793 A | * | 7/1978 | Berthet et al. | 310/52 |
| 4,728,840 A | * | 3/1988 | Newhouse | 310/113 |
| 5,019,733 A | | 5/1991 | Kano et al. | |
| 6,727,609 B2 | * | 4/2004 | Johnsen | 310/52 |
| 6,734,585 B2 | | 5/2004 | Tornquist et al. | |
| 7,834,492 B2 | | 11/2010 | Iund et al. | |
| 8,659,190 B2 | * | 2/2014 | Chamberlin et al. | 310/52 |
| 2003/0030333 A1 | * | 2/2003 | Johnsen | 310/54 |
| 2005/0206251 A1 | | 9/2005 | Foster | |
| 2010/0045125 A1 | * | 2/2010 | Takenaka et al. | 310/54 |
| 2010/0237725 A1 | * | 9/2010 | Tatematsu et al. | 310/61 |

FOREIGN PATENT DOCUMENTS

| | | |
|---|---|---|
| JP | 2009284718 | 12/2009 |
| JP | 2011114987 | 6/2011 |
| JP | 2011200038 | 10/2011 |
| WO | 2009011462 | 1/2009 |
| WO | 2011087433 | 7/2011 |

OTHER PUBLICATIONS

European Search Report for related European Patent Application No. 1316800.1, dated Jan. 8, 2014.

\* cited by examiner

*Primary Examiner* — Tran Nguyen
(74) *Attorney, Agent, or Firm* — Quarles & Brady LLP

(57) ABSTRACT

An electric motor coupled to a driven device of a vehicle. The electric motor includes a rotor and a shaft coupled to the rotor. The rotor has at least one radially oriented cavity and at least one fluid channel. The fluid channel extends in a generally axial direction. The fluid channel is fluidly connected to the at least one radially oriented cavity. The shaft has a fluid passageway therein. The at least one radially oriented cavity has a fluid connection to the fluid passageway of the shaft. The at least one radially oriented cavity leads to a radial exit from the rotor for a flow of fluid therefrom.

20 Claims, 3 Drawing Sheets

ELECTRIC MACHINE ROTOR COOLING METHOD

FIELD OF THE INVENTION

The present invention relates to electric motors and generators, and, more particularly, to a method and apparatus for cooling the rotor of an electric machine.

BACKGROUND OF THE INVENTION

An electric motor is an electromagnetic/mechanical device that converts electrical energy into mechanical energy. Conversely an electrical generator is an electromagnetic/mechanical device that converts mechanical energy into electrical energy. Electrical machines such as motors and generators operate through the interaction of magnetic fields and current carrying conductors generate the force or electricity respectively. Electric motors are found in applications as diverse as pumps, blowers, fans, machine tools, household appliances, power tools, disc drives in computers and the like. Electrical motors come in various sizes from small motors that are utilized in watches to rather large electric motor/generators utilized in locomotive engines.

A rotor of an electric motor is typically the rotating part of the motor and it rotates because the magnetic fields are arranged in the motor so that torque is developed about the axis of the rotor. Electrical systems typically include electrical power generators and motors which have permanent magnet or electromagnetic rotors. Heat is generated in the rotor due to the changing magnetic fields, which are present in the rotor causing the temperature to rise in the rotor. It is desirable to cool the rotor to protect the magnets or electromagnets from damage and to increase the electrical machine power density to allow for more power from a smaller physically sized electric motor.

Conventional cooling methods include convective air or oil circulation through the motor. A rotor cooling structure is illustrated in U.S. Pat. No. 5,283,488 in which a cylindrically shaped heat pipe is used to cool a rotor. The heat pipe has an internal vapor chamber with an evaporator end, a condenser end and a plurality of radial fins regularly spaced on the periphery of the heat pipe. Each fin defines an internal chamber communicating with and extending radially from a vapor chamber. A vaporizable liquid is disposed within the heat pipe and the heat exchanger is in thermal contact with a condenser end of the heat pipe.

It is also known to cool a rotor by utilizing cooling holes having a shape that is convex that goes through the rotor, as shown in U.S. Pat. No. 7,705,503, wherein the cooling holes are arranged having a predefined spacing from the paired permanent magnets. Coolant flows through the cooling holes to remove the heat conducted thereto.

The problem with the cooling method of the cited art is that they do not cool the rotor as effectively as needed.

What is needed in the art is an efficient cooling method and apparatus for directly cooling the magnets or electromagnets of an electric motor.

SUMMARY

The present invention provides a method and apparatus for cooling a rotor in an electric machine.

The invention in one form is directed to a vehicle having a driven device and an electric motor coupled and driving the driven device. The electric motor includes a rotor and a shaft coupled to the rotor. The rotor has at least one radially oriented cavity and at least one fluid channel. The fluid channel extends in a generally axial direction. The fluid channel is fluidically connected to the at least one radially oriented cavity. The shaft has a fluid passageway therein. The at least one radially oriented cavity has a fluid connection to the fluid passageway of the shaft. The at least one radially oriented cavity leads to a radial exit from the rotor for a flow of fluid therefrom.

The invention in another form is directed to an electric motor coupled to a driven device of a vehicle. The electric motor includes a rotor and a shaft coupled to the rotor. The rotor has at least one radially oriented cavity and at least one fluid channel. The fluid channel extends in a generally axial direction. The fluid channel is fluidly connected to the at least one radially oriented cavity. The shaft has a fluid passageway therein. The at least one radially oriented cavity has a fluid connection to the fluid passageway of the shaft. The at least one radially oriented cavity leads to a radial exit from the rotor for a flow of fluid therefrom.

The invention in yet another form is directed to a method of cooling an electric motor coupled to and driving a driven device in a vehicle. The method including the steps of moving a fluid, continuing the flow, diverting the flow and causing the fluid to exit a rotor. The moving step includes the moving of the fluid though a fluid passageway in a shaft. The shaft is coupled with the driven device. The continuing step including the continuing of the movement of the fluid from the fluid passageway into at least one radially oriented cavity of the rotor connected to the shaft. The diverting step includes the diverting of at least a portion of the fluid into at least one fluid channel in the rotor. The fluid channel extends in a generally axial direction. The fluid channel is fluidly connected to the at least one radially oriented cavity. The causing step includes causing the fluid to exit from the rotor by way of at least one radial exit in the rotor.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION

Figure 1:
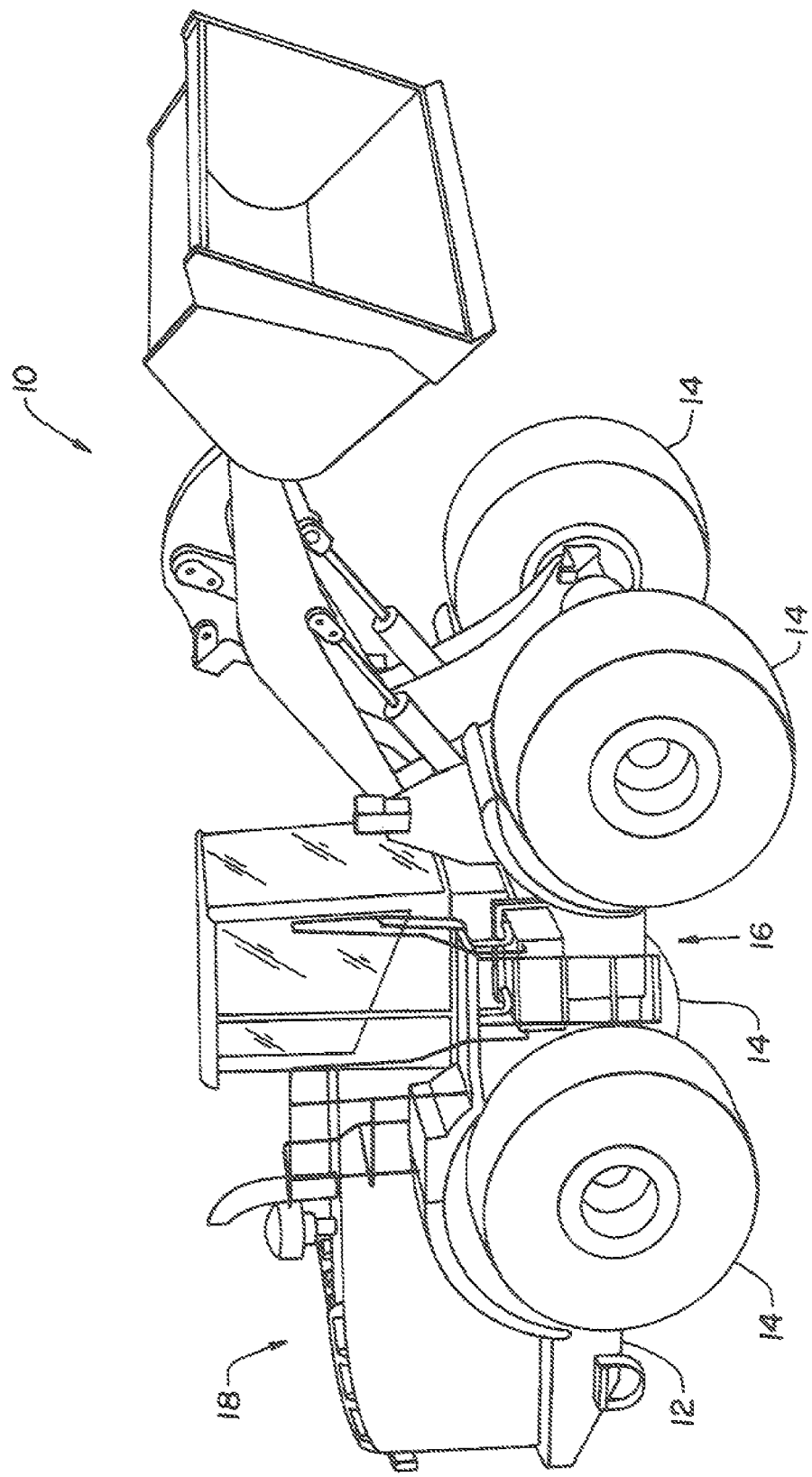
FIG. 1 illustrates a vehicle that utilizes an embodiment of an electric motor using a cooling method of the present invention.

Referring now to the drawings, and more particularly to FIG. 1, there is illustrated a vehicle 10, which may be in the form of an agricultural machine, a construction machine, a forestry machine or another type of vehicle. Vehicle 10 includes a chassis 12 with ground engaging devices 14 that are either directly or indirectly driven by at least one electric machine, illustrated as an electric motor 16 that is supplied electrical power by way of a power source such as an engine 18 with an electric generator connected thereto. Electrical power from the power source is applied, under the control of the machine operator, to electric motor 16 to drive driven devices 14.

Figure 2:
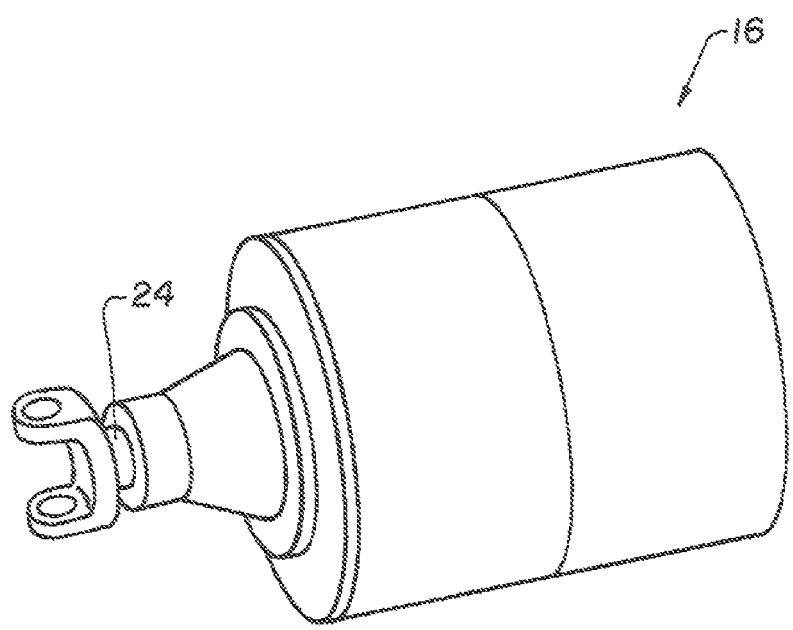
FIG. 2 is an electric motor utilized in the vehicle of FIG. 1.
Figure 3:
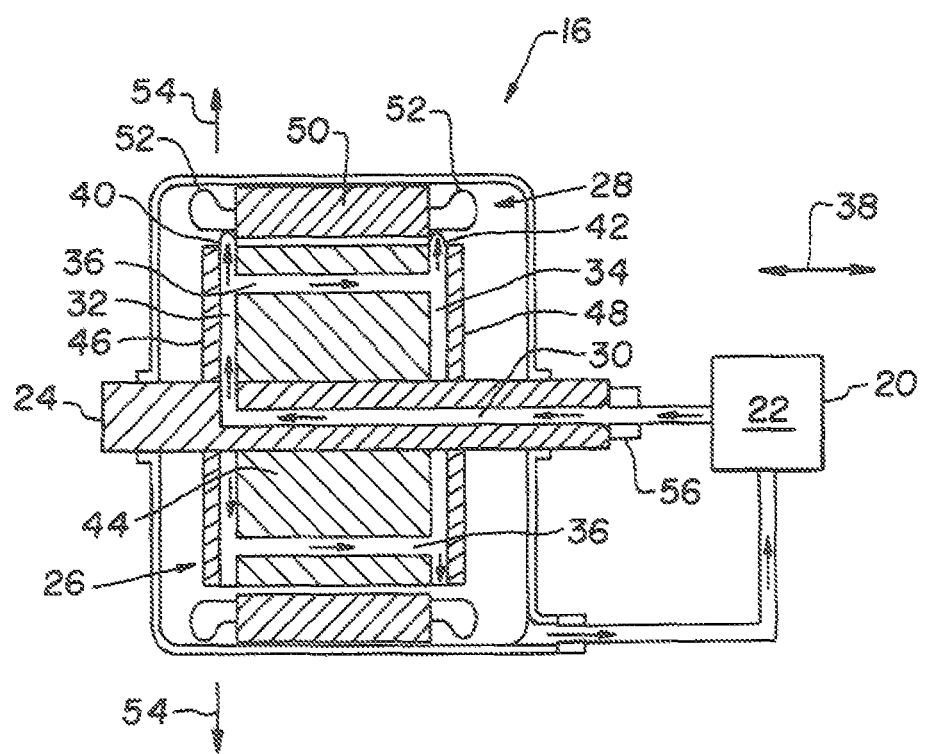
FIG. 3 is a cross-sectional schematical view of the electric motor of FIG. 2.

Now, additionally referring to FIGS. 2 and 3 there is illustrated more detail of electric motor 16, with the electrical connections being omitted for the sake of clarity. Mechanical power from electric motor 16 may be supplemental to a mechanical drive that provides power to driven device 14 or electric motor 16 may be the sole driver of driven devices 14. Electric motor 16 is cooled by a fluid coolant supply 20 having fluid 22 supplied therefrom and may include an external pump, supply tank and cooling system, not separately illustrated.

Electric motor 16 includes a shaft 24, a rotor 26 and a stator 28. A housing encompasses these elements thereby containing fluid 22 and helps to provide a return fluid flow path. Shaft 24 has a fluid passageway 30 allowing fluid 22 to flow into electric motor 16 and through a portion of shaft 24 in an axial direction 38. Rotor 26 is connected to shaft 24 and extends outwardly therefrom in a generally radial direction 54. Rotor 26 includes radially oriented cavities 32 and 34, a fluid channel 36, fluid exits 40 and 42, laminations 44 and rotor end caps 46 and 48. Stator 28 includes stator laminations 50 and end turns 52. Radially oriented cavities 32 and 34 are formed respectively by rotor end caps 46 and 48, which are respectively in contact with the end laminations of lamination stack 44. Radially oriented cavities 32 and 34 may extend substantially around a face of the respective end laminations. Flow of fluid 22, in radially oriented cavities 32 and 34, is in a generally radial direction 54 although a serpentine pathway is also contemplated. The shape of radially oriented cavities 32 and 34 may be used to distribute the flow of fluid 22 as it approaches fluid exits 40 and 42.

Fluid channel 36 extends from radially oriented cavity 32 through lamination stack 44 to radially oriented cavity 34. As seen in FIG. 3, fluid channel 36 may be radially spaced from shaft 24, such that a radially oriented cavity includes a first portion radially inward of fluid channel 36 and a second portion radially outward of fluid channel 36. Radially oriented cavity 32 and 34 may be substantially similar. Flow of fluid 22 through fluid channel 36 is in a generally axial direction 38, but in an opposite direction to the flow of fluid 22 that enters shaft 24 and passes through fluid passageway 30. Fluid 22 flows through fluid channel 36 in a direction substantially normal to the flow of fluid 22 in radially oriented cavities 32 and 34. Fluid exits 40 and 42 may be distributed around the circumference of rotor 26 and may be segmented or be in the form of slits between rotor end caps 46 and 48 and laminations 44. Additionally fluid exits 40 and 42 may be perforations in rotor end caps 46 and 48 or some other arrangement. Fluid exits 40 and 42 may be sized to control the flow of fluid 22 such that fluid 22 will flow through fluid channel 36. Fluid exits 40 and 42 may be differently sized to control the amount of fluid 22 going through fluid channel 36. Multiple fluid channels 36 may be spaced around rotor 26. Further, fluid channels 36 may travel in a spiral direction or some other quasi serpentine manner that travels in a generally axial direction 38 from radially oriented cavity 32 through laminations 44 to radially oriented cavity 34.

The motion of rotor 26 may enhance the flow of fluid 22 through fluid passageway 30, radially oriented cavity 32, fluid channel 36 and radially oriented cavity 34 in such a manner that as the motor speed increases more fluid is drawn through rotor 26.

As fluid 22 departs from fluid exits 40 and 42 some of the fluid comes in to contact with stator end turns 52 as well as stator laminations 50. Fluid 22 then is generally inside the housing of electric motor 16 and departs therefrom carrying the heat picked up in its travel through electric motor 16 for dissipation of the accumulated heat by way of fluid coolant supply 20 by conventional means.

As seen in FIG. 3, fluid 22 is introduced into one end of electric machine rotor shaft 24. Shaft 24 contains a radial hole that extends from fluid passageway 30 to introduce oil into radially oriented cavity 32 formed by rotor end cap 46 and laminations 44. Once fluid 22 is in radially oriented cavity 32, fluid 22 can flow radially then flow axially in fluid channel 36 that extends through laminations 44 into radially oriented cavity 34 at the opposite end of rotor 26. Fluid in either cavity 32 or 34 will flow radially out of rotor end caps 46 and 48 through cast or machined channels that direct fluid 22 to the underside of stator 24. This flow of fluid 22 allows heat to be carried away from rotor 26 and at least a portion of stator 28 to thereby effectively cool electric motor 16 in an efficient cost-effective manner.

Also shown in FIG. 3 is an interface device 56 that couples a fluid supply tube with rotating shaft 24 allowing the flow of fluid 22 therethrough for cooling of rotor 26 specifically and electric motor 16 generally. Although fluid flow is illustrated at fluid exits 40 and 42 at the top of the illustration as a curved surface extending from rotor 26, this is not shown at the bottom of the illustration, but fluid 22 is also moving in a similar fashion there as well. Several fluid channels 36 may exist around rotor 26 to substantially uniformly cool rotor 26. Fluid coolant supply 20 is schematically shown as a box and can include a pump, a fluid storage tank, a heat exchanger and an expansion tank as is needed to cool fluid 22 and to supply cooled fluid 22 to electric motor 16.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A vehicle, comprising:
  a driven device; and
  an electric motor coupled to and driving said driven device, the electric motor including:
  a rotor having at least one radially oriented cavity and at least one fluid channel, said fluid channel extending in a generally axial direction, said fluid channel being fluidly connected to said at least one radially oriented cavity, said at least one radially oriented cavity having a first portion radially inward of said fluid channel and a second portion radially outward of said fluid channel; and
  a shaft coupled to said rotor, said shaft having a fluid passageway therein, said at least one radially oriented cavity having a fluid connection to said fluid passageway, said at least one radially oriented cavity leading to a radial exit configured for a flow of fluid from said rotor.

2. The vehicle of claim 1, wherein said electric motor further includes a stator positioned to encounter at least some of the fluid exiting from said rotor.

3. The vehicle of claim 2, wherein said at least one radially oriented cavity and said at least one fluid channel are configured such that at least some of the fluid in said at least one radially oriented cavity is diverted to flow through said fluid channel.

4. The vehicle of claim 3, wherein said at least one radially oriented cavity includes a first radially oriented cavity and a second radially oriented cavity, said fluid channel fluidically connecting said first radially oriented cavity to said second radially oriented cavity.

5. The vehicle of claim 4, wherein the fluid flows in said fluid passageway in a first direction, the fluid flowing in said fluid channel in a second direction, said first direction and said second direction being substantially opposite.

6. The vehicle of claim 5, wherein said rotor further includes:
  at least one end cap; and
  a plurality of laminations through which said fluid channel extends, said end cap being in contact with at least one of said plurality of laminations with said at least one radially oriented cavity being therebetween.

7. The vehicle of claim 6, wherein said at least one end cap includes a first end cap and a second end cap, said first end cap being in contact with a lamination on one end of said plurality of laminations and said second end cap being in contact with a lamination on an opposite end of said plurality of laminations, said first end cap associated with said first radially oriented cavity and said second end cap being associated with said second radially oriented cavity.

8. The vehicle of claim 1, wherein said at least one radially oriented cavity includes a first radially oriented cavity and a second radially oriented cavity, said fluid channel being fluidly connected to said first radially oriented cavity and said second radially oriented cavity, said rotor being configured so at least some of the fluid flowing from said fluid passageway into said first radially oriented cavity, then flow into said fluid channel, then flow into said second radially oriented cavity.

9. An electric machine coupled to a driven device in a vehicle, the electric machine comprising:
  a rotor having at least one radially oriented cavity and at least one fluid channel, said fluid channel extending in a generally axial direction, said fluid channel being fluidly connected to said at least one radially oriented cavity, said at least one radially oriented cavity having a first portion radially inward of said fluid channel and a second portion radially outward of said fluid channel; and
  a shaft coupled to said rotor, said shaft having a fluid passageway therein, said at least one radially oriented cavity having a fluid connection to said fluid passageway, said at least one radially oriented cavity leading to a radial exit from said rotor for a flow of fluid.

10. The electric machine of claim 9, further comprising a stator positioned to encounter at least some of the fluid exiting from said rotor.

11. The electric machine of claim 10, wherein said at least one radially oriented cavity and said at least one fluid channel are configured such that at least some of the fluid in said at least one radially oriented cavity is diverted to flow through said fluid channel.

12. The electric machine of claim 11, wherein said at least one radially oriented cavity includes a first radially oriented cavity and a second radially oriented cavity, said fluid channel fluidically connecting said first radially oriented cavity to said second radially oriented cavity.

13. The electric machine of claim 12, wherein the fluid flows in said fluid passageway in a first direction, the fluid flowing in said fluid channel in a second direction, said first direction and said second direction being substantially opposite.

14. The electric machine of claim 13, wherein said rotor further includes:
  at least one end cap; and
  a plurality of laminations through which said fluid channel extends, said end cap being in contact with at least one of said plurality of laminations with said at least one radially oriented cavity being therebetween.

15. The electric machine of claim 14, wherein said at least one end cap includes a first end cap and a second end cap, said first end cap being in contact with a lamination on one end of said plurality of laminations and said second end cap being in contact with a lamination on an opposite end of said plurality of laminations, said first end cap associated with said first radially oriented cavity and said second end cap being associated with said second radially oriented cavity.

16. The electric machine of claim 9, wherein said at least one radially oriented cavity includes a first radially oriented cavity and a second radially oriented cavity, said fluid channel being fluidly connected to said first radially oriented cavity and said second radially oriented cavity, said rotor being configured such that at least some of the fluid flowing from said fluid passage way into said first radially oriented cavity then flows into said fluid channel then flows into said second radially oriented cavity.

17. A method of cooling an electric machine coupled to a driven device in a vehicle, the method comprising the steps of:
  moving a fluid though a fluid passageway in a shaft, said shaft being coupled with the driven device;
  continuing the movement of the fluid from said fluid passageway into at least one radially oriented cavity of a rotor connected to said shaft;
  diverting at least a portion of the fluid into at least one fluid channel in said rotor, said fluid channel being fluidly connected to a first portion and a second portion of said at least one radially oriented cavity, said first portion radially inward of said fluid channel and said second portion radially outward of said fluid channel; and
  causing the fluid to exit from said rotor by way of at least one radial exit in said rotor.

18. The method of claim 17, wherein a stator is positioned to encounter at least some of the fluid exiting from said rotor.

19. The method of claim 18, wherein said at least one radially oriented cavity includes a first radially oriented cavity and a second radially oriented cavity, said fluid channel fluidically connecting said first radially oriented cavity to said second radially oriented cavity.

20. The method of claim 19, wherein the fluid flows in said fluid passageway in a first direction, the fluid flowing in said fluid channel in a second direction, said first direction and said second direction being substantially opposite.

* * * * *